Patented Mar. 5, 1946

2,396,019

UNITED STATES PATENT OFFICE 2,396,019

INSECTICIDES

Charles W. Murray, Glenside, Pa., asssignor to Claude R. Wickard, as Secretary of Agriculture of the United States of America, and his successors in office No Drawing. Application February 5, 1943, Serial No. 474,859

3 Claims. (Cl. 167—34)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to insecticidal compositions, such as those containing nicotine or piperidine.

Many alkaloid compositions, the most important of which is nicotine sulfate, have been prepared and used as insecticides with varying degrees of success. These have a number of disadvantages such as water solubility, resulting in their ready removal from plants due to dew and rain, poor spreading qualities, rapid dissipation when exposed to air and sunlight, and non-adherence to dusting or diluent materials, resulting in their separation from the materials and consequent uneven distribution over the area treated.

This invention has among its objects the preparation of insecticides containing compositions which are not readily removed from plants treated with them; which withstand well the action of wind, rain and sunlight; which can be combined with a carrier or diluent material such as wood pulp, in such manner that they remain attached to the individual particles of the pulp; which will penetrate fibrous organic materials such as cellulosic fibers, wool, silk and protein materials; and which, when applied to such materials, are fast.

In general, the objects of the invention are attained by reacting nicotine or piperidine with acid dyes, nicotine being preferred. The compositions so obtained are salts of the acid dye and the nicotine or piperidine and they have the insecticidal properties of the nicotine or piperidine and the penetrating and adherent properties of the dyes.

In some instances it is desirable to form corresponding compositions which also contain a metal such as copper. This renders the materials as a whole more fast and enhances their spreading and staining properties.

Acid dye materials of various type molecules may be reacted with the nicotine or piperidine to form the desired compositions. Those acid dye materials containing carboxyl and nitro radicals are the most suitable, although those containing the phenolic radical are quite reactive with the nicotine or piperidine, especially if they also contain one or more nitro groups. The essential requirement is either that they contain an acid group which makes them capable of reacting with the nicotine or piperidine to form the desired composition, or that they contain a salt group which can be converted to the proper acid group by treatment with acids. The term "acid dye" as herein used is intended to include all such dyes. Metals such as copper or zinc may be used in the preparation of those compositions requiring the presence of a metal.

The following examples are given to indicate a few of the possible compositions and the manner of their preparation in greater detail.

Example I

An azo dye of the type molecule,

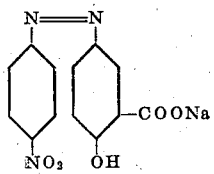

sodium p-nitrobenzene-azo-salicylate, was used. The dye, dissolved in a minimum quantity of water, was mixed with nicotine, in the form of the hydrochloride, in a dye to nicotine ratio of 65 to 35 and was allowed to stand overnight. The precipitate of flat, rectangular, reddish brown crystals was filtered out, washed rapidly with a small quantity of cold water in a suction filter, and dried at room temperature.

Analysis of the resulting product indicated a 34.4 percent nicotine content.

Example II

An alizarine dye of the type molecule,

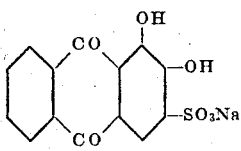

sodium salt of 1:2 dihydroxy-anthraquinone-3-sulfonic acid, was used. The dye, in a concentrated water solution, was mixed with a 99 percent nicotine alkaloid in a dye to alkaloid ratio of 70 to 30. The mixture was allowed to stand, and it turned to a deep red color. Absolute alcohol was then added to give an approximate 50 percent water-alcohol system. The nicotine-alizarine complex, thrown down as a heavy voluminous gel-like precipitate, was filtered out, washed two or three times with absolute alcohol or ethyl ether, and dried at room temperature.

The resulting dark colored product contained 20 to 30 percent nicotine, although this figure varies considerably depending upon the conditions of drying, the longer drying periods and the higher temperatures giving the lower nicotine content. The product is fairly stable.

*Example III*

A commercial dye material, known as Martius yellow, of the type molecule,

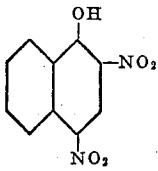

2:4 dinitro-α-naphthol, was used. The dye material, dissolved in water, was mixed with agitation with a 99 percent nicotine alkaloid in a dye material to alkaloid ratio of 50 to 12. The mixture was not very reactive and a 7 percent solution of hydrochloric acid was added in quantity sufficient to cause complete precipitation. The precipitate, a fine yellow crystalline product, was filtered out.

Analysis of the resulting product indicated a 19.2 percent nicotine content.

Some commercial varieties of the above-mentioned type dye material may be separated into two materials, one of which will, when used as indicated above, result in a crystalline product containing about 17.0 percent, and the other in one containing about 27.0 percent nicotine.

*Example IV*

A tartrazine dye of the type molecule,

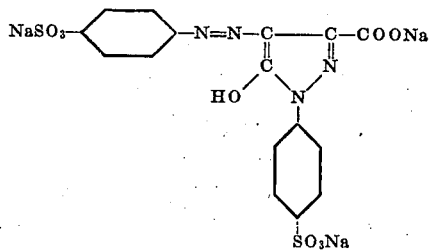

sodium salt of 4-p-sulfobenzene-azo-1-p-sulfophenyl-5-hydroxy-pyrazol-3-carboxylic acid, was used. A concentrated water solution of the dye was first made which was precipitated by treatment with a few drops of dilute hydrochloric acid. The precipitate was filtered out, washed with absolute alcohol or with ethyl ether and air-dried. The precipitate, moistened with a little water or alcohol, was then mixed with nicotine alkaloid in the ratio of 80 parts of the original dye to 20 parts of the alkaloid, which when warmed is a sufficient quantity of the alkaloid to make a complete solution. The resulting solution was air-dried slowly on the water bath.

The nicotine dye salt thus obtained is soluble in water and somewhat difficult to obtain in pure state. Products showing as high as 19.5 percent nicotine were, however, obtained.

*Example V*

An indigotine dye type molecule,

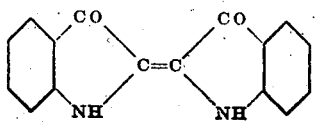

2:2-bis-indole-indigo, was sulfonated and then reacted with nicotine alkaloid to give the nicotine dye. To 80 parts of the dry powdered dye, 400 parts of concentrated sulfuric acid was added, the whole was warmed gently at about 60° C. for an hour, was allowed to cool and was washed three times with ethyl ether, leaving the sulfonated dye in the form of a powder. The powder was dissolved in approximately 100 parts of distilled water to which 30 parts of nicotine alkaloid was added. The whole was evaporated to dryness on the water bath and the residue was washed with ethyl ether.

The resulting product was a viscous paste containing approximately 18 percent nicotine.

*Example VI*

An azo dye of the type used in Example I was dissolved in a 50 percent alcohol-water system, and was precipitated by treatment with a few dops of 7 percent hydrochloric acid. The precipitate was filtered out and washed three times with water. It was then covered with water and piperidine added very slowly with agitation, resulting in a dark red solution. The solution was evaporated slowly on a water bath until crystallization commenced, and was then chilled on ice to more completely crystallize the piperidine dye.

*Example VII*

Martius yellow (of the type used in Example III) was dissolved in a minimum quantity of water to which nicotine as the hydrochloride was added with agitation in a dye to nicotine ratio of 65 parts to 27 parts. To this 9 parts of copper acetate in solution was added with stirring. A greenish yellow precipitate formed which was filtered out on a suction filter, washed with water and air-dried.

The resulting product showed 26.8 percent nicotine and 9.2 percent copper.

*Example VIII*

An azo dye (of the type molecule of Example I but using the free acid instead of the sodium salt) was dissolved in water to which nicotine alkaloid was added in a dye to nicotine ratio of 75 to 18. The pH of the solution was adjusted to 7 by addition of a small quantity of hydrochloric acid. To this 7 parts of copper acetate in solution was added with stirring. The resulting precipitate was filtered out, washed twice with cold water and air-dried.

The resulting product, after grinding in a mortar, was dark brown and showed 17 percent nicotine and 7.2 percent copper.

Fibrous organic materials, such as wood pulp or other finely divided hair-like particles of cellulosic, wool, silk or similar materials capable of being dyed, may be penetrated with the compositions of this invention in a manner similar to the process of dyeing. If finely divided materials of the kind herein mentioned are employed as carriers or dilutents, the resulting insecticidal material is suitable for dusting, or it can be combined with spray materials or made into pastes or paints in ways well known to the art, and its use results in a uniform distribution of the insecticide over the area treated.

Another manner of treating the fibrous material with the nicotine or piperidine and the dye is first to treat the material with the nicotine or piperidine, press it, and then treat it with the dye, thus attaching the nicotine or piperidine to the material.

Another beneficial property arising out of the use of hair-like particles of dilutent materials of the kind above-mentioned is that of their ability to leave a heavy deposit when mixed with a spray material. Addition of wood pulp to a spray materially increases the thickness of the coating which is formed by the spray. Similar results are obtained when the wood pulp is treated with the compositions of this invention plus about 1 percent oil.

Some of the compositions of this invention will stain protein and wool materials very well. They will stain caterpillars, cocoons and webs spun by insect larvae and spiders.

Having thus described my invention, what is claimed is:

1. An insecticide comprising a carrier of finely divided, fibrous, organic material dyed with the salt of an acid azo dye and nicotine.

2. The process of producing an insecticide comprising forming an aqueous solution of an acid azo dye and mixing nicotine therewith to form a salt of the nicotine and the acid azo dye.

3. The process of producing an insecticide comprising forming an aqueous solution of an acid dye having the type molecule

[chemical structure: two benzene rings joined by N=N, with NO₂ and OH substituents on one ring and COONa on the other]

mixing nicotine therewith to form a salt of the nicotine and acid dye, and dyeing a carrier of fibrous, organic material with the salt thus formed.

CHARLES W. MURRAY.